US009824687B2

(12) United States Patent
Sugiura et al.

(10) Patent No.: US 9,824,687 B2
(45) Date of Patent: Nov. 21, 2017

(54) SYSTEM AND TERMINAL FOR PRESENTING RECOMMENDED UTTERANCE CANDIDATES

(71) Applicant: National Institute of Information and Communications Technology, Tokyo (JP)

(72) Inventors: Komei Sugiura, Tokyo (JP); Hideo Okuma, Tokyo (JP); Noriyuki Kimura, Tokyo (JP); Yoshinori Shiga, Tokyo (JP); Teruaki Hayashi, Tokyo (JP); Etsuo Mizukami, Tokyo (JP)

(73) Assignee: National Institute of Information and Communications Technology, Tokyo (JP)

(*) Notice: Subject to any disclaimer, the term of this patent is extended or adjusted under 35 U.S.C. 154(b) by 373 days.

(21) Appl. No.: 14/406,015

(22) PCT Filed: Jul. 1, 2013

(86) PCT No.: PCT/JP2013/068007
§ 371 (c)(1),
(2) Date: Mar. 16, 2015

(87) PCT Pub. No.: WO2014/010450
PCT Pub. Date: Jan. 16, 2014

(65) Prior Publication Data
US 2017/0148436 A1   May 25, 2017

(30) Foreign Application Priority Data
Jul. 9, 2012   (JP) ................................. 2012-153941

(51) Int. Cl.
*G10L 15/22* (2006.01)
*G06F 17/28* (2006.01)
(Continued)

(52) U.S. Cl.
CPC ............ *G10L 15/22* (2013.01); *G06F 3/0482* (2013.01); *G06F 3/167* (2013.01); *G06F 17/289* (2013.01);
(Continued)

(58) Field of Classification Search
CPC ....................................................... G10L 15/22
(Continued)

(56) References Cited

U.S. PATENT DOCUMENTS

| 8,620,662 B2* | 12/2013 | Bellegarda | G10L 13/06 704/260 |
| 8,731,929 B2* | 5/2014 | Kennewick | G10L 15/22 704/246 |

(Continued)

FOREIGN PATENT DOCUMENTS

| JP | 2002-125050 A | 4/2002 |
| JP | 2011-123530 A | 6/2011 |

(Continued)

OTHER PUBLICATIONS

International Search report for corresponding International Application No. PCT/JP2013/068007 dated Aug. 13, 2013.

*Primary Examiner* — Susan McFadden
(74) *Attorney, Agent, or Firm* — Renner Otto Boisselle & Sklar, LLP (57) ABSTRACT

[Object] An object is to provide an easy-to-use speech processing system attaining higher accuracy of speech recognition.
[Solution] Receiving a speech utterance, the speech processing system performs speech recognition and displays a text of the recognition result. Further, the speech processing system translates the recognition result in accordance with settings to a text of another language and displays and synthesizes speech of the translated result. Further, the (Continued)

speech processing system selects utterance candidates having high possibility to be uttered as the next utterance and having high translation and speech recognitions scores, using outputs of various sensors at the time of utterance, a pre-trained utterance sequence model and translation and speech recognition scores of utterance candidates, and recommends utterance candidates in the form of an utterance candidate recommendation list. A user can think of what to say next using the utterances in utterance candidate recommendation list as hints.

14 Claims, 7 Drawing Sheets

(51) Int. Cl.
| | |
|---|---|
| *G10L 13/08* | (2013.01) |
| *G10L 15/14* | (2006.01) |
| *G10L 15/30* | (2013.01) |
| *G06F 3/0482* | (2013.01) |
| *G06F 3/16* | (2006.01) |

(52) U.S. Cl.
CPC .............. *G10L 13/08* (2013.01); *G10L 15/14* (2013.01); *G10L 15/30* (2013.01)

(58) Field of Classification Search
USPC .............................................................. 704/2
See application file for complete search history.

(56) References Cited

U.S. PATENT DOCUMENTS

| | | | |
|---|---|---|---|
| 9,214,001 B2 * | 12/2015 | Rawle | .................... G06Q 90/00 |
| 2002/0046035 A1 | 4/2002 | Kitahara et al. | |
| 2006/0129409 A1 | 6/2006 | Mizutani et al. | |
| 2012/0221323 A1 | 8/2012 | Sumita et al. | |

FOREIGN PATENT DOCUMENTS

| | | |
|---|---|---|
| WO | WO 2006/040971 A1 | 4/2006 |
| WO | WO 2011/036769 A1 | 3/2011 |

* cited by examiner

SYSTEM AND TERMINAL FOR PRESENTING RECOMMENDED UTTERANCE CANDIDATES

TECHNICAL FIELD

The present invention relates to a service utilizing speech recognition and, more specifically, to a technique allowing a user to communicate smoothly, using speech recognition.

BACKGROUND ART

The portable telephones, particularly smartphones, are now widely used and various applications have appeared. Of these, applications using speech input are believed to become popular, partly because it is difficult to input texts on a small device such as a smartphone.

Among such applications using speech input, for those types of applications which requires uttering a series of simple texts such as "YES/NO" displayed on a screen, the user never wonders to say next. If speech input is used as a tool for communication with another person such as in the case of speech translation, however, it is common that the user hesitates to use such an application, as the user is not sure what to input by speech. Assume a trial of speech translation application. Often, the user will be at a loss as to what to say to start.

Further, it is not uncommon that the user hems and haws "uh" or "er" before actually starts an utterance. Such meaningless sound decreases accuracy of speech recognition.

A situation in which one must say something but cannot think of what to say is common and such a problem is not limited to the field of speech translation. Such a situation occurs when we talk to other people. Sometimes we run out of conversation topics and just cannot find anything to say next.

Patent Literature 1 specified below discloses a topic suggesting device for presenting topics to keep conversation going when they run out of topics. According to the disclosure of Patent Literature 1, the system uses topics database storing topics and keywords associated with the topics, with the keywords selected from viewpoints commonly used for topics. There are different viewpoints prepared in advance. This system operates as follows: words and phrases are extracted from conversations of users; weight of each of the words and phrases with respect to each of the viewpoints is calculated; the topic last presented to the user is compared with each of the topics stored in the topics database and similarity therebetween is calculated viewpoint by viewpoint; the similarity is multiplied by the weight of word/phrase calculated for each viewpoint, and the sum of multiplication results is obtained. The topic having the largest sum is presented to the user as a suggestion of the new topic. The viewpoints typically include the so-called "5W1H."

According to Patent Literature 1, the device can present a topic that is close to the viewpoint at the center of current conversation and far from other viewpoints.

CITATION LIST

Patent Literature

Patent Literature 1: Japanese Patent Laying-Open No. 2011-123530

SUMMARY OF INVENTION

Technical Problem

The invention described in Patent Literature 1, however, has a problem that though it is possible to specify the topic for the conversation if the conversation is sufficiently long, it is difficult to determine a topic to be presented if the conversation is short. Particularly, when each utterance is quite short as in the case of conversation using speech translation, it is very difficult to apply the invention described in Patent Literature 1.

A problem unique to speech translation is that the speaker worries too much about what to say in order to obtain correct speech recognition and correct translation. Sometimes this leads the user to say something unnecessary or meaningless, so that his/her utterance cannot be translated correctly. It is preferable for speech translation system that the user's utterance is easy to recognize and easy to translate automatically. If consideration of such easiness makes it harder for the user to make any utterance, however, the effect of speech translation cannot sufficiently be attained.

Therefore, an object of the present invention is to provide an easy-to-use speech processing system with more accurate speech recognition results as well as to provide a terminal used for the speech processing system.

Another object of the present invention is to provide an easy-to-use speech processing system with more accurate speech recognition results and more accurate speech service provided using the results of speech recognition results, as well as to provide a terminal used for the speech processing system.

Solution to Problem

According to a first aspect, the present invention provides a speech processing system, including: utterance input means for receiving an input of utterance information including a speech signal representing an utterance and prescribed environmental information representing an environment in which the utterance is made; speech recognition means for performing speech recognition on the speech signal in the utterance information received by the utterance input means and for outputting a recognition result as a text; data processing means for executing a prescribed data processing on the text output by the speech recognition means; utterance sequence model storage means for storing an utterance sequence model statistically trained such that upon reception of a text of an utterance and the prescribed environmental information, a probability of an utterance in a prescribed set of utterances to be uttered successively following the utterance represented by the text can be calculated; utterance storage means for storing utterances in the prescribed set of utterances and degree of confidence of data processing when each of the utterances in the set of utterances is processed by the data processing means; and utterance candidate recommendation means, for scoring, in the set of utterances, candidates of utterances to be recommended to a user who made the utterance recognized by the speech recognition means, based on an evaluation score obtained by combining, in a prescribed form, a probability calculated for each utterance in the prescribed set by the utterance sequence model stored in the utterance sequence model storage means, using the result of recognition by the speech recognition means of the utterance information received by the utterance input means and the environmental information included in the speech information, and the degree of confidence of the data processing on each utterance in the prescribed set of utterances, and for recommending an utterance candidate to the user based on the scores.

When the utterance input means receives an input of utterance information, the speech recognition means performs speech recognition of a speech signal in the utterance information, and outputs a text as a result of recognition. The data processing means performs data processing on the text. Using the text as the result of recognition and the environmental information included in the utterance information, the utterance candidate recommendation means calculates the probability of each utterance to be the next utterance based on the utterance sequence model, scores utterances to be recommended as the next utterance, using the probability and the degree of confidence of each utterance in the data processing, and recommends the candidates of next utterance in accordance with the result of scoring.

Since the candidate for the next utterance is recommended, the user obtain hints or insights for the next utterance, using the utterance candidate as a hint. Thus, the possibility that the user is at a loss as to what to utter next becomes lower.

Preferably, the data processing means includes automatic translation means receiving a result of recognition output from the speech recognition means of a given utterance, for automatically translating the result of recognition to a language different from the language of the given utterance and for outputting the translated result as a text. The degree of confidence is the likelihood of the translated result by the automatic translation means being a translation of the given utterance in the different language.

More preferably, the data processing means further includes speech synthesizing means for synthesizing, based on the text in the different language output from the automatic translation means, a speech signal of the different language.

The utterance candidate recommendation means may include means for estimating, in the set of utterances, a candidate of an utterance that successively follows the utterance speech-recognized by the speech recognition means, based on an evaluation in terms of a linear sum of the probability calculated by the utterance sequence model for each utterance in the prescribed set and the degree of confidence of each utterance in the prescribed set stored in the utterance storage means. Here, in the linear sum, coefficients of the degree of confidence and the probability are both positive.

Preferably, the speech processing system further includes utterance candidate presenting means for presenting to the user an utterance candidate recommended by the utterance candidate recommendation means.

More preferably, the speech processing system further includes utterance text information input means, receiving utterance text information including a text representing an utterance and the prescribed environmental information, for applying the text in the utterance text information to the utterance candidate recommendation means and the data processing means, in place of the output of the speech recognition means.

According to a second aspect, the present invention provides a terminal, including: a microphone; a set of sensors for collecting pieces of information related to surrounding environment; a display device; a communication device; and utterance information transmitting means, connected to the microphone, the set of sensors and the communication device, for transmitting utterance information containing a speech signal obtained from a signal output by the microphone upon reception of an utterance and pieces of information obtained from the set of sensors when the speech signal is obtained, to a prescribed speech processing server through the communication device, and for requesting speech recognition and a prescribed data processing on a result of recognition. The terminal further includes: process result presenting means, connected to the communication device, for receiving a process result of the data processing transmitted from the speech processing server in response to the request, and for presenting the process result to a user; and utterance candidate recommendation list display means, receiving an utterance candidate recommendation list recommended as a plurality of utterance candidates from the speech processing server and displaying the list on the display device, and thereby recommending utterance candidates to the user.

Preferably, the prescribed data processing performed by the speech processing server on the result of the speech recognition is a process of automatically translating the utterance to a language different from the language of the utterance and further synthesizing a speech of a result of the automatic translation. The process result of the data processing transmitted from the speech processing server is a speech signal representing the speech synthesized by the speech processing server. The process result presenting means includes a speaker, and means for driving the speaker with the speech signal representing the speech synthesized by the speech processing server.

More preferably, the terminal further includes: selecting means operable by a user for selecting any of the utterance candidates displayed by the utterance candidate recommendation list; and utterance text information transmitting means, responsive to selection of any of the utterance candidates in the utterance candidate recommendation list by the selecting means, for transmitting utterance text information including a text of the selected utterance candidate and pieces of information obtained from the set of sensors to a prescribed speech processing server through the communication device, and requesting the prescribed data processing on the utterance text information.

Advantageous Effects of Invention

As described above, the present invention lowers the possibility that the user using the speech service will be at a loss as to what to say, and makes the speech service easier to use. Further, meaningless "ah" or "eh" uttered before the user thinks of what to say will be reduced, and hence, accuracy of speech recognition can be increased and the accuracy of speech service using the results of speech recognition can also be increased.

As a result, an easy-to-use speech processing system and the terminal, attaining higher accuracy of speech recognition, can be provided.

Further, an easy-to-use speech processing system and the terminal, attaining higher accuracy of speech recognition and higher accuracy of speech service utilizing the results of speech recognition, can be provided.

DESCRIPTION OF EMBODIMENTS

In the following description and in the drawings, the same components are denoted by the same reference characters. Therefore, detailed description thereof will not be repeated.

First Embodiment

<Configuration>
—Overall Configuration—

Figure 1:
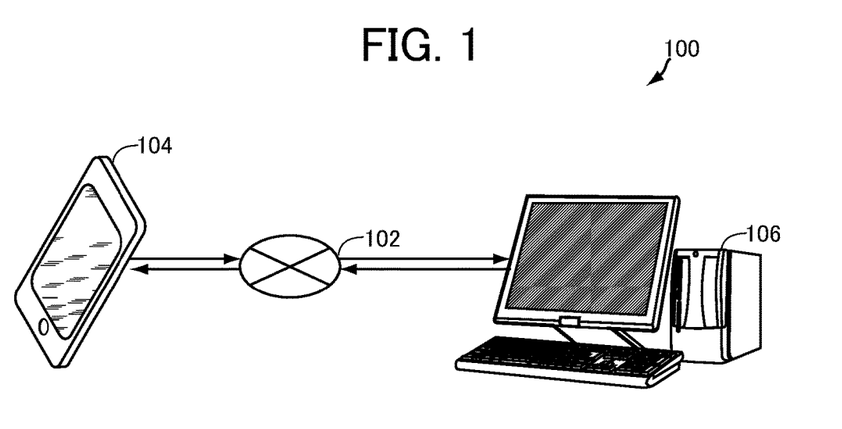
FIG. 1 is a schematic diagram showing an overall configuration of a speech translation system in accordance with a first embodiment of the present invention.

Referring to FIG. 1, a speech translation system 100 in accordance with the present invention includes: a server 106, connected to the Internet 102, for performing a speech translation service; and a portable terminal 104, connectable to the Internet 102, having installed therein an application for using the speech translation service.

—Application Screen—

Figure 2:
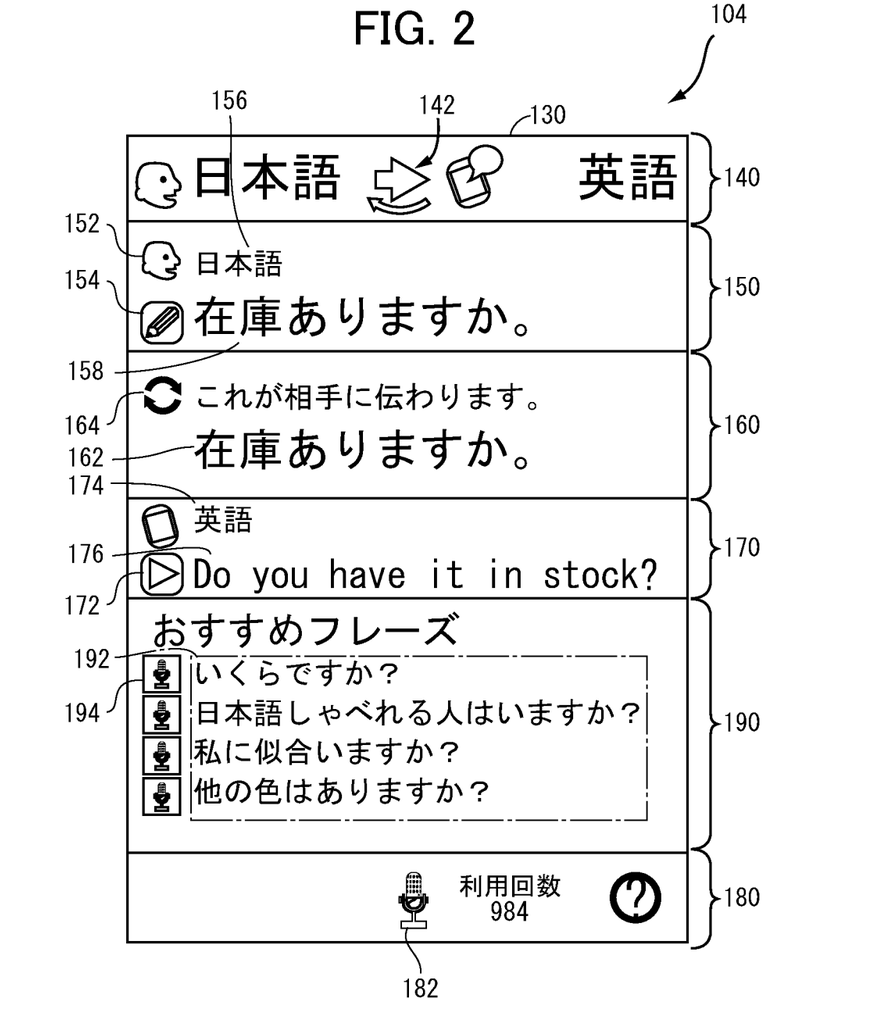
FIG. 2 schematically shows a screen for speech translation displayed on a screen of a portable terminal used in the system shown in FIG. 1.

Referring to FIG. 2, an application screen 130 allowing use of the speech translation service of portable terminal 104 is roughly divided into six areas. Specifically, the areas include: a language display area 140 for indicating a pair of languages (source language and target language) as the object of speech translation service; an input text display area 150 displaying a recognition result of speech input in the source language; a translation result display area 170 displaying a text resulting from automatic translation of the speech-recognized sentence; a reverse translation area 160 displaying a sentence obtained by reverse translation of the result of translation to the original language; an utterance candidate recommendation area 190 displaying a list of candidates recommended as candidates for the next utterance (utterance candidate recommendation list); and a status area 180 displaying the status of use of the speech translation system.

On language display area 140, the language name of source language is displayed on the left side, and the language name of target language is displayed on the right side, both in the source language. It is noted that on the application screen, texts other than the result of translation are all displayed in the source language. Between the language names of source and target languages, a settings button 142 for setting the combination of speech translation is displayed.

On input text display area 150 are arranged: a display 156 of the language name of source language, a speech input button 152 operated by the user at the time of speech input, and a text input button 154 causing display of a text input screen allowing direct input of input text rather than the speech input. The result of speech input and the result of text input are both displayed as text 158 in input text display area 150. In the present embodiment, during the speech input button 152 is pressed, speech is recorded. When pressing of speech input button 152 is stopped, recording of speech ends.

On reverse translation area 160 are displayed: a sentence 162 as a result of reverse translation of the sentence in the target language, obtained by automatic translation from the result of speech input, to the source language, and a translation button 164 for starting translation when, for example, a sentence is text-input. By reverse translating the result of translation obtained from the input source language sentence back to the source language and displaying the result on reverse translation area 160, it becomes possible to determine whether the translation correctly conveys the intention of the speaker. In the description of the present embodiment, however, details of the functional portion related to the reverse translation will not be described here, for easier understanding of the embodiment.

On translation result display area 170 are displayed: the name 174 of target language, a text 176 of the sentence resulting from automatic translation (sentence in the target language), and a replay button 172 for replaying synthesized speech of text 176. The result of speech translation is automatically output as synthesized speech, and if one wishes to hear the result again, he/she may do so by operating replay button 172.

On utterance candidate recommendation area 190 are displayed: an utterance candidate recommendation list 192 containing utterances recommended as utterances highly likely be uttered following the immediately preceding utterance by the user and highly likely be accepted for automatic translation, and a translation request button 194 corresponding to each utterance of utterance candidate recommendation list 192 for issuing a translation request for each utterance.

On status area 180, the status of use of the system such as the number of use, and a microphone button 182 are displayed. Microphone button 182 has a function of starting recording, as does speech input button 152. Unlike speech input button 152, when microphone button 182 is pressed once and released, recording of speech starts, and when microphone button 182 is again pressed and released, recording of speech stops.

—Sequence of Speech Translation—

Figure 3:
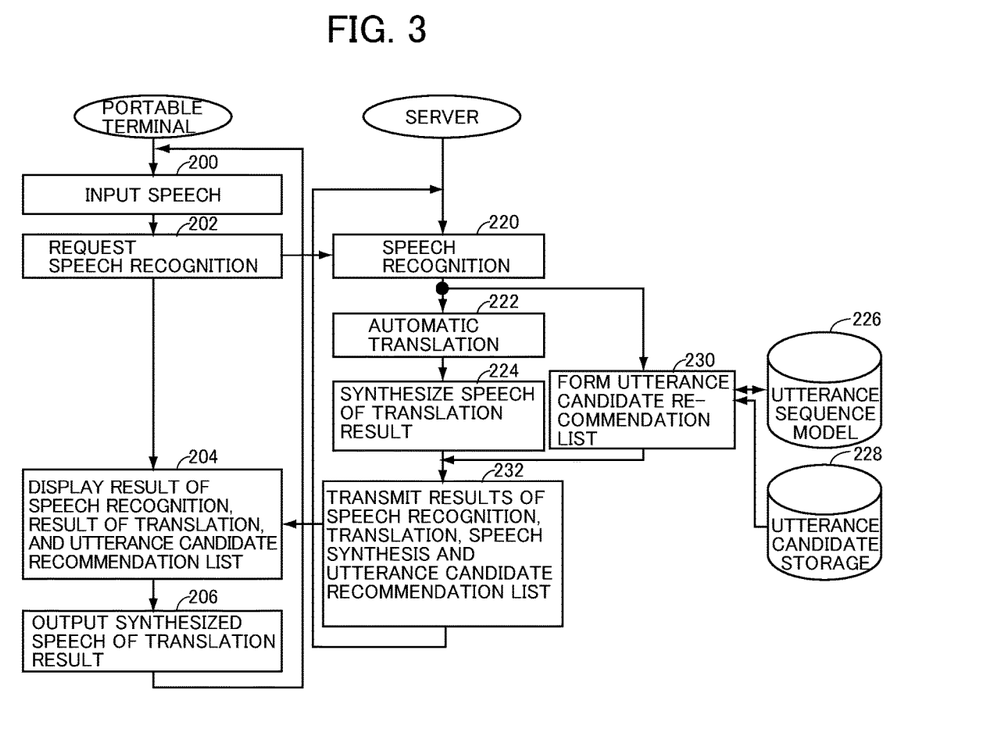
FIG. 3 shows a process sequence for speech translation, executed between the portable terminal and a server in the speech translation system in accordance with the first embodiment.

Referring to FIG. 3, a typical communication sequence between portable terminal 104 and server 106, for the speech translation using speech translation system 100 will be described. First, speech input 200 is done by portable terminal 104, and a speech recognition request 202 including the speech, information such as the combination of languages for speech translation, and environmental information obtained by a set of sensors, is generated. The speech recognition request 202 is transmitted from portable terminal 104 to server 106. Receiving the speech recognition request, server 106 performs a speech recognition process 220, and outputs a text as a result of speech recognition (in the present embodiment, speech recognition process 220 is a statistical speech recognition process, and only one hypothesis having the highest score of recognition is output). The text is applied as an input to automatic translation process 222. In the automatic translation process 222, the input sentence in the source language is translated to the target language, and a sentence in the target language is generated. The sentence in the target language is applied to a speech synthesizing process 224. In the speech synthesizing process 224, speech is synthesized from the applied sentence in the target language.

The text resulting from recognition by speech recognition process 220 is also applied, together with the environmental information, to an utterance candidate list forming process 230. Server 106 includes: an utterance sequence model 226, which is a statistical model trained in advance to be able to calculate probability to be uttered following a given utterance, for each utterance in a set of utterances; and an utterance candidate storage unit 228 storing a set of utterances each having a translation score representing acceptability for automatic translation process 222 of the utterance in the source language. In utterance candidate list forming process 230, using the probability of each utterance in the set of utterances calculated by utterance sequence model 226 and the translation score of each utterance stored in utterance candidate storage unit 228, a prescribed number of utterances that are highly likely to be uttered next and having higher translation scores are selected, and these are output in the form of a list. In the present embodiment, for this evaluation, an evaluation score consisting of a linear sum of the probability of a certain utterance to be uttered next and the translation score of the utterance is used. In the present embodiment, the utterance having higher evaluation score is regarded as more appropriate as the candidate. Therefore, each coefficient of linear sum is positive. The values of coefficients differ depending on the order of probability and the order of translation score and, therefore, the coefficient values must be determined appropriately based on specific combinations.

Utterance sequence model 226 is statistically trained such that when it receives a text of an utterance and environmental information when the utterance is made, it can calculate the probability that each utterance in a prescribed set of utterances is uttered successively following the utterance represented by the text.

The text of the result of speech recognition output from speech recognition process 220, the text of the result of translation obtained by automatic translation process 222, the synthesized speech data synthesized by speech synthesizing process 224, and the utterance candidate list formed by utterance candidate list forming process 230 are all applied to a transmitting unit 232 for transmitting these to portable terminal 104. Transmitting unit 232 converts the applied data to a prescribed format for transmission, and transmits the converted data to portable terminal 104.

Receiving the data from transmitting unit 232, portable terminal 104 displays the received result of speech recognition, the result of automatic translation and the utterance candidate list (step 204). Further, portable terminal 104 outputs the synthesized speech received from transmitting unit 232 (step 206). After the output, portable terminal 104 returns to the standby state, waiting for the next speech input 200.

As mentioned above, what is shown in FIG. 3 is a typical process sequence. When text input is done instead of speech input, process sequence to be executed differs from that shown in FIG. 3.

—Portable Terminal 104—

Figure 4:
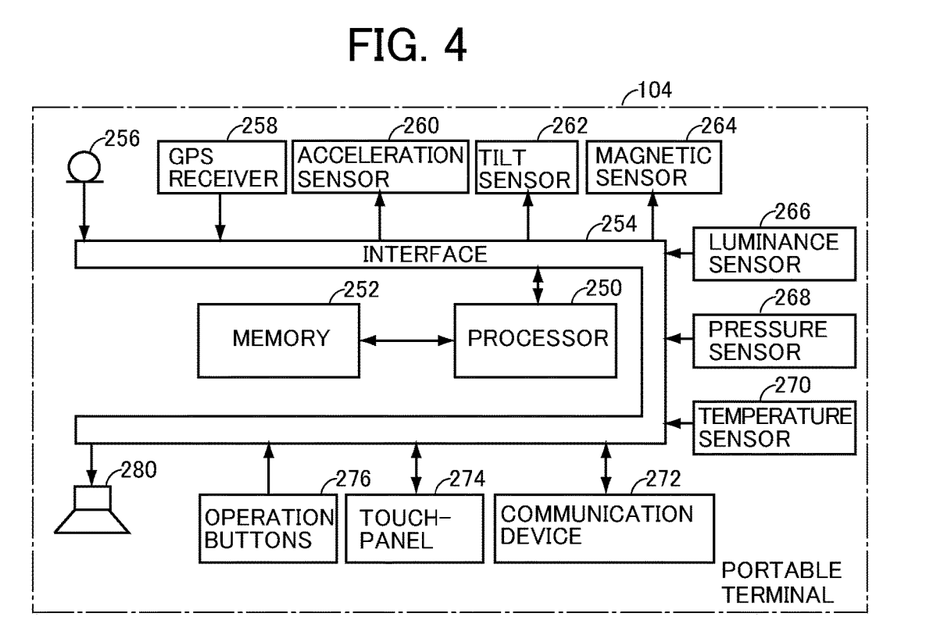
FIG. 4 is a block diagram showing hardware configuration of the portable terminal.

Referring to FIG. 4, portable terminal 104 includes: a processor 250 controlling various units and components of portable terminal 104 by executing a prescribed program and thereby realizing various functions; a memory 252 storing programs executed by processor 250 and data necessary for executing the program and also functioning as a work area of processor 250; and an interface between processor 250 and various sensors, which will be described later. Every component described in the following can communicate with processor 250 through interface 254.

Portable terminal 104 further includes a number of sensors including: a GPS receiver 258 for obtaining latitude and longitude information of the position of portable terminal 104 by a GPS function; an acceleration sensor 260 for detecting acceleration of portable terminal 104 in three axial directions; a tilt sensor 262 for detecting tilt of portable terminal 104 with respect to the three axes; a magnetic sensor 264 for detecting magnetic field around portable terminal 104; a luminance sensor 266 detecting luminance around portable terminal 104; a pressure sensor 268 detecting pressure on a prescribed position of portable terminal 104; and a temperature sensor 270 detecting temperature around portable terminal 104. The portable terminal further includes: a microphone 256; a communication device 272 connectable by wireless communication to the Internet 102 through a base station, not shown; a touch panel 274; an operation button 276 provided on a housing of portable terminal 104 apart from touch panel 274; and a speaker 280.

GPS receiver 258, acceleration sensor 260, tilt sensor 262, magnetic sensor 264, luminance sensor 266, pressure sensor 268 and temperature sensor 270 are for collecting pieces of information representing the environment when an utterance is made. In the present embodiment, outputs of these sensors when a speech is input are transmitted in a prescribed form to server 106 as the environmental information representing the environment at the time the utterance is made, together with settings information such as the language pair for speech translation and ADPCM speech signal obtained from the speech. The pieces of information transmitted in this manner to server 106 is a speech translation request asking speech recognition of the uttered speech and data processing on the result of speech recognition, that is, automatic translation and speech synthesis of translation result.

Figure 5:
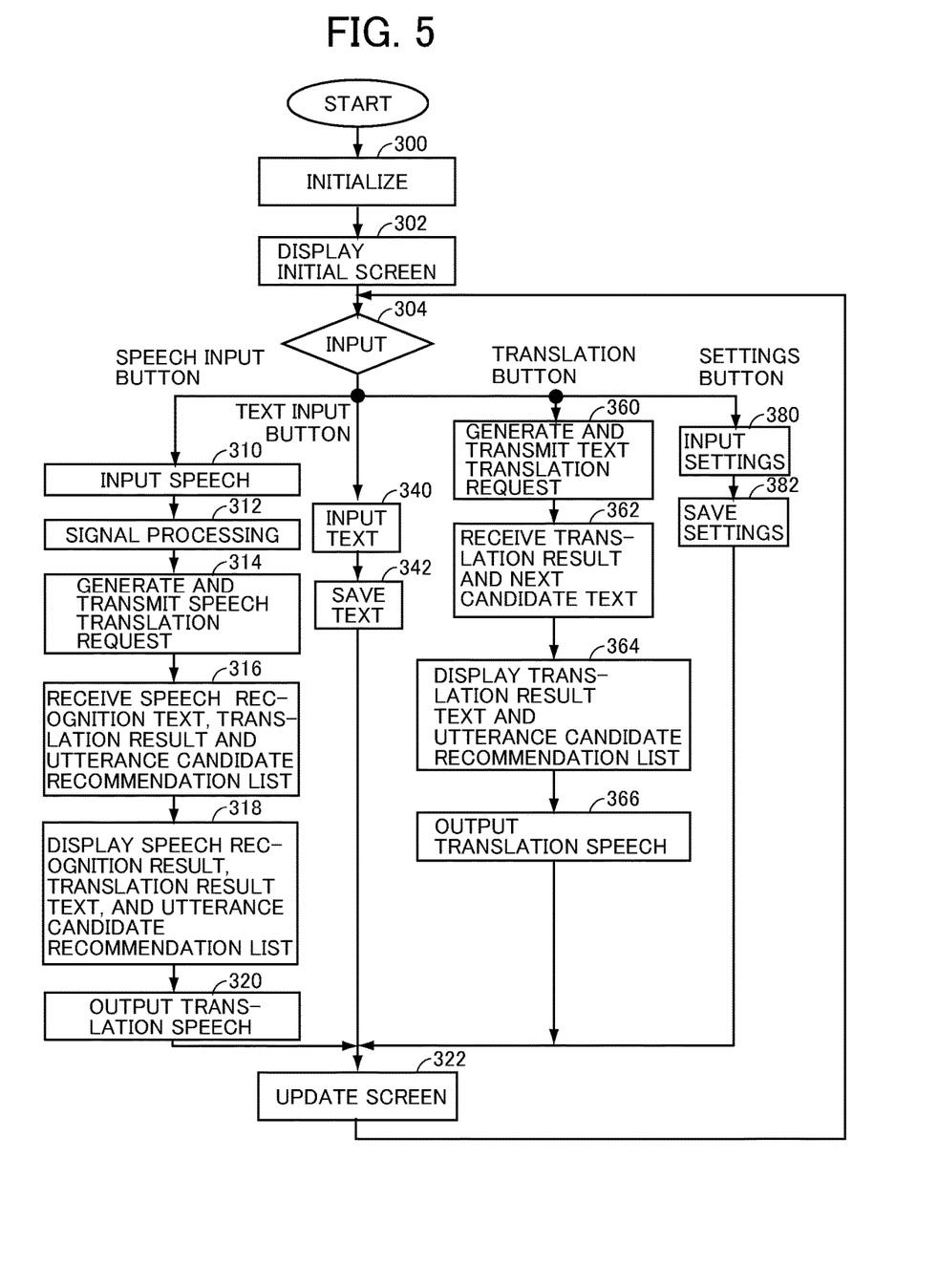
FIG. 5 is a flowchart representing a control structure of a program realizing a process accompanying the speech translation using a speech input, in the portable terminal.

Among various programs realizing the functions of portable terminal 104, the application allowing use of speech translation service has such a control structure as will be described in the following. Referring to FIG. 5, when the program is activated, an initialization process is executed (step 300), in which a memory area is ensured, and various memory locations are initialized with prescribed initial values. When initialization is complete, an initial screen allowing the speech translation service is displayed on touch panel 274 of portable terminal 104 (step 302). On the initial screen, speech input button 152, text input button 154, microphone button 182 and settings button 142 are active, while translation button 164 and replay button 172 are inactive.

Then, the program waits for an input from a user and, depending on what is input, the flow of control is branched (step 304).

When the speech input button (speech input button 152 of FIG. 2) is pressed, the speech input process is executed (step 310). The speech input process is done by calling an API (Application Programming Interface) for the speech input. Thereafter, the input speech is subjected to a prescribed signal processing, and a speech signal in the form of ADPCM (Adaptive Differential Pulse Code Modulation) is generated (step 312). Further, based on the speech signal, outputs of various sensors at this time and settings information such as the translation language, the speech translation request is generated and transmitted to server 106 (step 314).

Thereafter, the result of speech recognition, the result of automatic translation, synthesized speech thereof, and the list of utterance candidates are received from server 106 (step 316) and these are stored in prescribed memory areas, in order to display the text representing the result of speech recognition, the text representing the result of automatic translation and the list of utterance candidates on input text display area 150, reverse translation area 160 and translation result display area 170 of FIG. 2, respectively, (step 318). Further, the synthesized speech representing the result of automatic translation is generated by driving speaker 280 (step 320). Specifically, by driving speaker 280, the requested result of translation of the utterance is presented in the form of a speech, to the user. Finally, application screen 130 is updated (step 322), and the flow returns to step 304 to wait for an input. Here, in addition to speech input button 152, text input button 154 and microphone button 182, replay button 172 is activated.

When the text input button (text input button 154 of FIG. 2) is pressed at step 304, the API for text input is called and thereby an input of text is received (step 340). The input text is saved (step 342), the screen is updated so that the input text is displayed on input text display area 150 and reverse translation area 160 (step 322), and the flow returns to step 304. Here, on the updated screen, translation button 164 is activated while replay button 172 is invalidated.

When the translation button (translation button 164 of FIG. 2) is pressed at step 304, using the text input at step 340 and saved at step 342, the outputs of various sensors at that time, and the settings information, the text translation request is generated and transmitted to server 106 (step 360). Thereafter, the result of translation in response to the request, the synthesized speech representing the result of translation, and the utterance candidate recommendation list are received (step 362). The received text representing the result of translation is displayed on translation result display area 170 (FIG. 2) (step 364), and the synthesized speech representing the result of translation is output (step 366). Then, application screen 130 is updated (step 322), and the flow returns to step 304.

Finally, when settings button 142 is pressed, a screen prepared beforehand for allowing changes to the settings is displayed and any change to the settings is received (step 380). When settings are completed, the resulting settings are saved in memory 252 (step 382). Then, application screen 130 is updated in accordance with the changed settings (step 322), and the control returns to step 304.

—Server 106—

Figure 6:
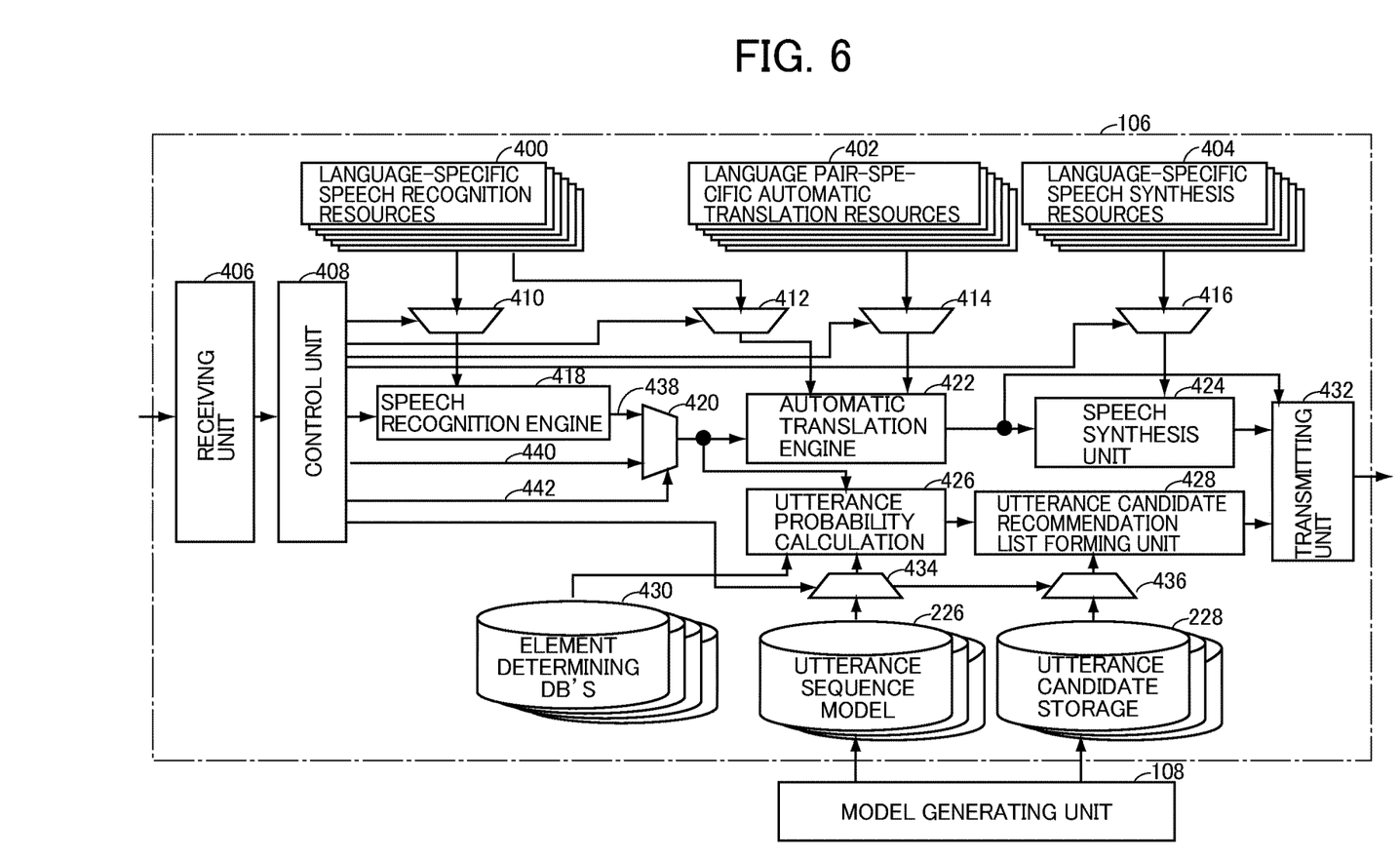
FIG. 6 is a functional block diagram of a server executing the process of receiving speech inputs from a plurality of portable terminals, translating the inputs to a designated language, synthesizing speeches of the translation and returning the synthesized speeches to the portable terminals, in the speech translation systems in accordance with the first embodiment.

Referring to FIG. 6, server 106 has the following functional configuration. In terms of hardware, server 106 is realized by a computer having an external storage of large capacity, and a speech translation server program executed on the computer.

Server 106 includes: a receiving unit 406 receiving a speech translation request and a text translation request from an unspecified number of terminals such as portable terminal 104, through the Internet 102 (see FIG. 1); and a control unit 408 governing overall control of speech translation by analyzing the requests received by receiving unit 406, supplying data to a prescribed functional module or outputting a control signal for data selection, in accordance with the result of analysis. Server 106 further includes: language-specific speech recognition resources 400 prepared in advance for each of a plurality of languages, for realizing speech recognition of a plurality of source languages and for generating sentences in target languages in automatic translation; language pair specific resources 402 prepared in advance for automatic translation for each combination of a plurality of source languages and a plurality of target languages; and language-specific speech synthesis resources 404 prepared in advance for speech synthesis, for each of the target languages.

In the present embodiment, language-specific speech recognition resources 400 includes, for each language, a statistic acoustic model, a dictionary and a statistic language model for speech recognition. The dictionary and the language model are also used in automatic translation when the corresponding language is the target language. Therefore, server 106 further includes: a selecting unit 410 for selecting resources of the source language designated by the speech translation request from language-specific speech recognition resources 400; and a selecting unit 412 for selecting resources of the target language designated by the speech translation request from language-specific speech recognition resources 400.

Language pair specific resources 402 includes, for each combination of the source language and the target language, a statistic translation model prepared in advance. Server 106 further includes a selecting unit 414 for selecting resources of the language pair designated by the speech translation request, from language pair specific resources 402.

Language-specific speech synthesis resources 404 include language-by-language resources necessary for speech synthesis of the target language. If the speech synthesis is of the speech element concatenating type, language-specific speech elements DB is included in the resources. Server 106 further includes a selecting unit 416 for selecting resources of the target language designated by the speech translation request, from language-specific speech synthesis resources 404.

Control unit 408 has a function of transmitting a control signal causing each of selecting units 410, 412, 414 and 416 to select appropriate resources, based on the combination of source and target languages included in the speech translation request.

Server 106 further includes: a speech recognition engine 418, receiving the ADPCM data in the speech translation request from control unit 408, performing speech recognition of the source language using the resources selected by selecting unit 410, and outputting the resulting text data; an automatic translation engine 422, receiving the text data in the source language output from speech recognition engine 418, translating the sentence in the source language to a sentence in the target language, using the resources of target language selected by selecting unit 412 and the resources corresponding to the language pair of source and target languages selected by selecting unit 414, and outputting the result as text data; and a speech synthesizing unit 424, receiving the text data in the target language output from automatic translation engine 422 and performing speech synthesis using the language resources selected by selecting unit 416.

Between the output of speech recognition engine 418 and the input of automatic translation engine 422, a selecting unit 420, having two inputs and an output connected to an input of automatic translation engine 422, is inserted. One input of selecting unit 420 is connected to an output 438 of speech recognition engine 418. To the other input, text data 440 in the text translation request output from control unit 408 is input. As described above, portable terminal 104 allows not only speech input but also text input. In case of speech input, text data as the output 438 of speech recognition engine 418 is applied to automatic translation engine 422, while in the case of text input, text data 440 in the request is directly applied to automatic translation engine 422, not through speech recognition engine 418. Which of the two inputs is selected by selecting unit 420 is controlled by control unit 408 using a switch signal 442, in view of the contents of speech translation request. The process related to the text translation request differs from the process related to the speech translation request only in the manner of input and the process steps after the automatic translation are the same as those related to the speech translation request. Therefore, detailed description of the process related to the text translation request will not be repeated here. It is noted that the output values of various sensors included in the speech translation request are attached both to the text data output from speech recognition engine 418 and the text data applied directly from control unit 408 to selecting unit 420.

Server 106 further includes: various DBs 430 for determining elements used for converting the output values of various sensors added in the speech translation request to values of elements of feature vectors used for estimating candidates for the next utterance; storage units for storing a plurality of utterance sequence models 226 prepared for a plurality of languages as objects; storage units 228 for storing a plurality of utterance candidates prepared for a plurality of languages as objects; and selecting units 434 and 436, selecting a model and an utterance candidate storing unit corresponding to the language of utterance from the plurality of utterance sequence models 226 and the plurality of utterance candidate storage units 228, and for connecting these to a utterance probability calculating unit 426 and to an utterance candidate recommendation list forming unit 428. Server 106 further includes: an utterance probability calculating unit 426, receiving the text data output from selecting unit 420 and calculating, for each of utterances prepared in advance, probability of the utterance to be the next utterance following the given utterance, using various databases DB 430 for determining elements and the utterance sequence model 226; utterance candidate recommendation list forming unit 428, for forming the utterance candidate recommendation list, based on the probability calculated for each utterance by utterance probability calculating unit 426 and on translation and speech recognition scores of respective utterances stored in utterance candidate storage unit 228, by selecting, from utterances of higher scores, a plurality of utterances having high possibility to be uttered next and having high possibility to be accepted (correctly translated) by automatic translation engine 422; and a transmitting unit 432, configuring return data of a prescribed data format from the text data representing the result of translation output from automatic translation engine 422, the synthesized speech output from speech synthesizing unit 424 and the utterance candidate recommendation list generated by utterance candidate recommendation list forming unit 428, and returning the data to the terminal (portable terminal 104 or the like) that has transmitted the speech translation request.

The above-described utterance sequence models 226 and utterance candidate storage units 228 must be prepared beforehand. For this purpose, a model generating unit 108 is provided. Configuration of model generating unit 108 will be described later.

Figure 7:
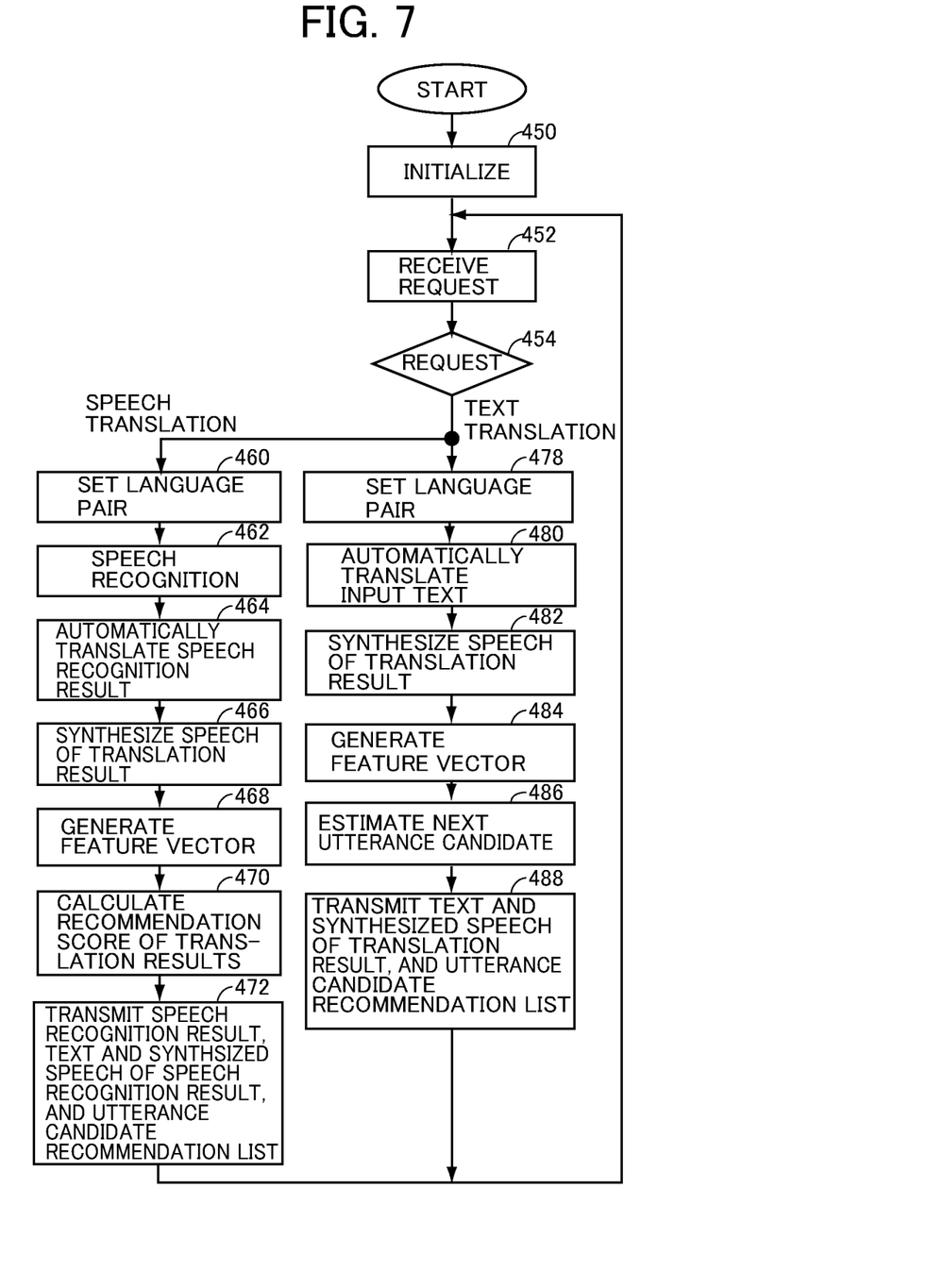
FIG. 7 is a flowchart of a program for realizing the function of the server shown in FIG. 6.

Referring to FIG. 7, the program executed by the hardware of the computer implementing server 106 to realize the functions of control unit 408 shown in FIG. 6 has such a control structure as described in the following. Specifically, it includes: a step 450 of initialization, executed when the program is activated, for performing processes that must be executed once immediately after activation, such as securing a necessary memory area and initialization; a step 452, executed after initialization, of waiting for a request related to speech translation, from another terminal through the Internet 102; and a step 454, of branching the flow of control depending on what request is received at step 452.

If the request is determined to be the speech translation request, based on the information of language pair included in the request, the combination of the source language and the target language are configured, selecting units 410, 412, 414 and 416 shown in FIG. 6 are configured (step 460), and speech recognition is carried out (step 462). When the speech recognition is completed, using the text in source language representing the result as an input, automatic translation to the target language is carried out (step 464). When the automatic translation is completed, using the output text resulting from the automatic translation as an input, the speech synthesis is carried out (step 466). Further, based on the text data obtained at step 462, a feature vector for estimating the next utterance is generated (step 468). For generating the feature vector, raw sensor outputs included in the request may be used, or the raw sensor outputs may be converted to values of other categories using various databases DB 430 for element determination (see FIG. 6). By way of example, the GPS outputs latitude and longitude information. This may be directly used as elements of feature vector. Alternatively, corresponding relation between latitude and longitude information and facility name existing at that position or regional name including that position may be stored in the database DB 430 for element determination, and the information may be converted to the facility name or regional name and the converted values may be used as elements for the feature vector. Using the generated feature vectors, utterance probability calculating unit 426 shown in FIG. 6 estimates a prescribed number of utterance candidates that will highly likely be uttered next. Further, using utterance candidate storage unit 228 shown in FIG. 6, based on the evaluation score obtained by combining the probability of each utterance candidate and the translation and speech recognition scores, a prescribed number of utterance candidates having high translation scores and having high probability of being the next utterance are selected, and thereby the utterance candidate recommendation list is formed (step 470). Finally, the result of speech recognition in the source language obtained at step 462, the text representing the result of automatic translation obtained at step 464, the speech synthesis obtained at step 466 and the utterance candidate recommendation list obtained at step 470 are returned to the counterpart terminal (step 472), and the control returns to step 452.

By contrast, if the request is determined to be the text translation request, based on the settings information of language pair included in the request, selecting units 410, 412, 414 and 416 shown in FIG. 6 are set (step 478), and the input text in the source language is automatically translated to the target language (step 480). Based on the obtained text in the target language, a speech in the target language is synthesized (step 482). Based on the input text in the source language and the environmental information included in the request, feature vectors are generated (step 484), and with reference to the utterance sequence model 226, the utterance candidate recommendation list comprised of utterance candidates having high translation scores and high possibility to be uttered next is formed (step 486). Finally, the text data in the target language obtained at step 480, the synthesized speech of the target language obtained at step 482 and the utterance candidates obtained at step 486 are transmitted to the portable terminal (step 488), and the control returns to step 452.

The foregoing is the outline of control structure of the program realizing server 106 shown in FIG. 6.

Figure 8:
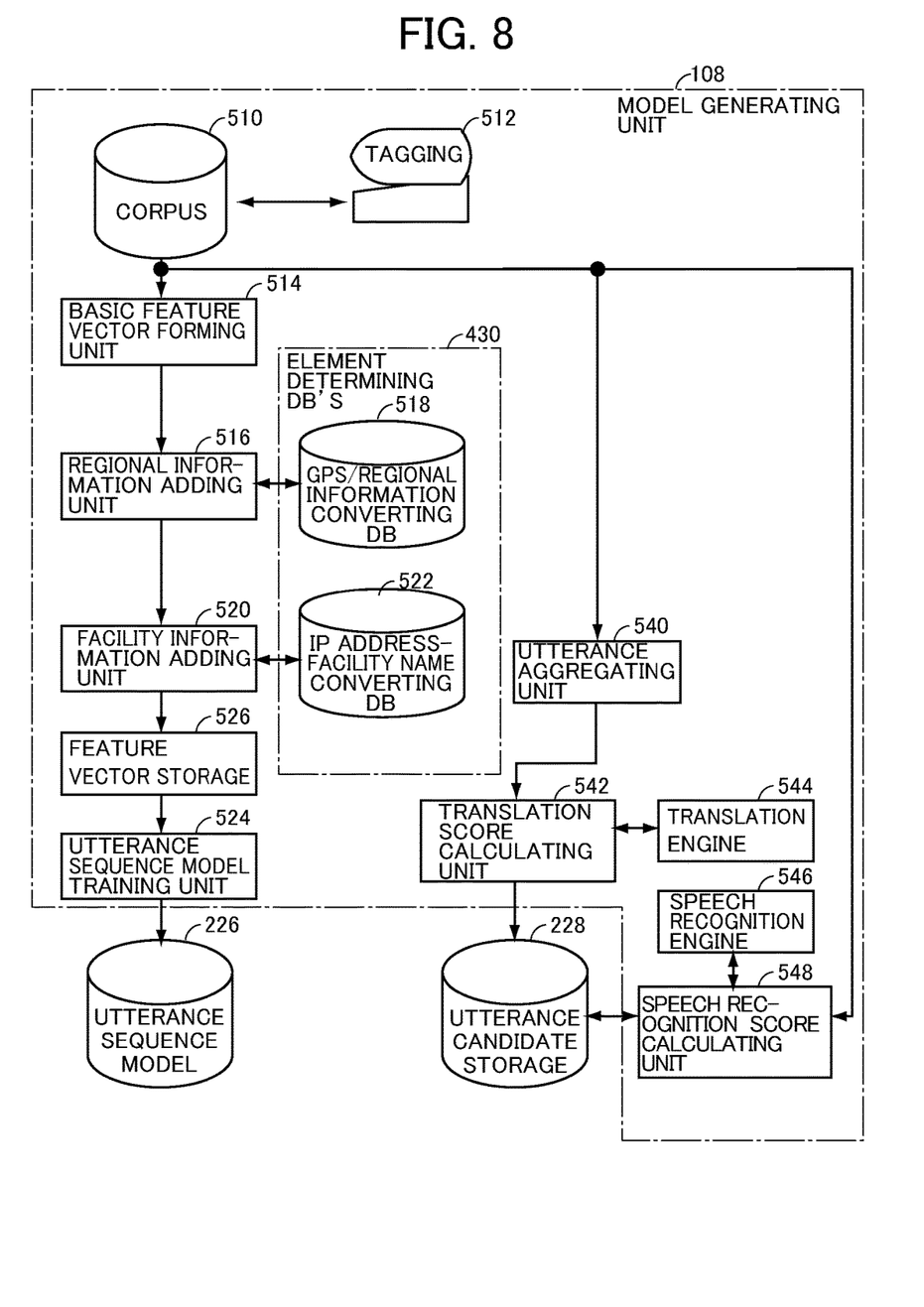
FIG. 8 is a block diagram of a model generating unit performing training of utterance sequence model used in the server and calculating translation scores of utterances in a corpus.

The utterance sequence models 226 and a set of utterance candidates stored in utterance candidate storage units 228 shown in FIG. 6 must be prepared in advance. A configuration of model generating unit 108 for this purpose is as shown in FIG. 8. In the present embodiment, various databases DB 430 for element determination shown in FIG. 6 includes a GPS/regional information converting DB 518 storing corresponding relation between the latitude/longitude information obtained from a GPS and regional information of country, region, state, prefecture, city, town and the like specified by the latitude/longitude information, and an IP address-facility name converting DB 522 storing corresponding relation between IP addresses and facility names having the IP addresses allocated.

Referring to FIG. 8, model generating unit 108 includes a corpus 510 including a large number of utterance texts of a single language. An utterance stored in corpus 510 includes speech data of the utterance and a transcript text from the utterance. Each transcript text is divided to prescribed units such as morphemes, and to each unit area attached: a tag, referred to as a DA (Dialog Activity) tag, representing a situation where the utterance is made, is added. Further, to each utterance, the date and time when the utterance was made, a user ID or a terminal ID of the user who made the utterance, the position of the user (latitude and longitude obtained by the GPS), the IP address of the terminal that has transmitted the utterance, and information of acceleration, tilt, magnetism, luminance, pressure and temperature detected by the sensors of the terminal. Of these pieces of information, for the piece of information that could not be obtained by the portable terminal because, for example, the corresponding sensor is absent, a prescribed value indicating absence of information, is inserted.

Model generating unit 108 further includes: an input unit 512 used by the user when morphological analysis, tagging or other process is to be done manually to the utterance data contained in corpus 510; and a basic feature vector forming unit 514 for forming, from each of the sentences stored in corpus 510, a basic feature vector, from which training data for training utterance sequence model 226 is generated. Basic feature vector forming unit 514 arranges, in a prescribed order, at least for each sentence stored in corpus 510, the date and time, user ID or terminal ID and various pieces of sensor information attached to the sentence, and then forms a vector having an identification number of the next uttered utterance as an element.

Model generating unit 108 further includes: a regional information adding unit 516, comparing the latitude/longitude information included in each feature vector generated by basic feature vector forming unit 514 with GPS/regional information converting DB 518 and thereby obtaining regional information of the country, region, state, prefecture, city or town where the utterance corresponding to the feature vector was made, and inserting the information in an appropriate position in the feature vector; a facility information adding unit 520, receiving the feature vector from regional information adding unit 516, comparing the IP address contained therein with IP address-facility name converting DB 522 and thereby obtaining the facility name where the utterance was made, and inserting this in an appropriate position in the feature vector; a feature vector storage unit 526 storing the feature vectors output from facility information adding unit 520; and an utterance sequence model training unit 524, for performing statistical learning of utterance sequence model 226, using the feature vectors stored in feature vector storage unit 526 as training data.

Model generating unit 108 further includes: an utterance aggregating unit 540, aggregating same utterances from the utterances included in corpus 510 and thereby generating a set consisting only of utterances different from each other; a translation engine 544 translating each of the utterances aggregated by utterance aggregating unit 540 to a plurality of languages, and outputting score of translation result for each utterance; and a translation score calculating unit 542, averaging, utterance by utterance, translation result scores obtained by the translation to the plurality of languages by translation engine 544, thereby calculating a mean translation score of each utterance and storing it in utterance candidate storage unit 228. Here, translation engine 544 is assumed to be one that performs statistical automatic translation, and likelihood of the translation result is regarded as the translation score. A higher translation score means that the original utterance in the source language is easy to translate.

Model generating unit 108 further includes: a speech recognition engine 546 performing speech recognition of speech data of each utterance contained in corpus 510; and a speech recognition score calculating unit 548, comparing transcript data of each utterance contained in corpus 510 with the result of recognition of the utterance by speech recognition engine 546, thereby calculating a speech recognition score of each utterance, and having the score added to each utterance so as to be stored in utterance candidate storage unit 228.

Though a single model generating unit 108 is shown in FIG. 8, it is noted that model generating unit 108 must be prepared for each source language of translation. As to the translation engine 544, all translation engines available for one source language may be used and the resulting translation scores may be averaged. Alternatively, translation engines for only a specific plurality of target languages may be used to calculate translation scores, and the resulting scores may be averaged. In some cases, translation engines 544 for only one language as the target language may be used.

<Operation>
—Outline—

Speech translation system 100 operates in the following manner. Server 106 has two operation phases. The first is the training of utterance sequence model 226 and utterance candidate storage unit 228 by model generating unit 108, and the second is the execution of speech translation service using the trained utterance sequence model 226 and utterance candidate storage unit 228. In the following, first, the operation of server in the training phase will be described and then the operation of portable terminal 104 and server 106 in the speech translation service phase will be described.

—Training—

It is necessary to train utterance sequence model 226, and to train the translation scores and the speech recognition scores of each of the utterances stored in utterance candidate storage unit 228 in advance. For this purpose, for every language as the object of processing, sentences are collected separately, and corpus 510 is formed language by language. It is preferred that each sentence in corpus 510 is subjected to morphological analysis or the like and provided with a DA tag in advance. If necessary, such a processing is done using input unit 512.

Each sentence in corpus 510 (containing both speech data and transcript texts) of a certain language is subjected to the following processes. Specifically, using pieces of information attached to the sentence, a basic feature vector is formed by basic feature vector forming unit 514 (FIG. 8). Here, based on the information of user ID and the date and time of utterance attached to each utterance, which utterance follows which utterance is specified, and a piece of information specifying the next utterance is inserted into an element at an appropriate position in the feature vector. Thereafter, the latitude/longitude information included in each feature vector is compared with GPS/regional information converting DB 518 to obtain, from the latitude/longitude information, the regional information of country, region, state, prefecture, city, town or the like, and the obtained information is inserted into an appropriate element in the feature vector. If the corresponding information is absent, a specific value indicating the absence of information is input to the element (same for other elements). Further, the IP address included in the feature vector is compared with the IP address-facility name converting DB 522 to convert the IP address at which the utterance was recorded to the facility name corresponding to the IP address, and the result is input to an appropriate element in the feature vector. In this manner, the feature vectors are accumulated in feature vector storage unit 526.

After the feature vectors are accumulated in feature vector storage unit 526, or in parallel with the accumulation, utterance sequence model training unit 524 executes statistical training of utterance sequence model 226. The statistical training will result in utterance sequence model 226 capable of calculating a probability that an utterance will be uttered next, for each utterance, upon receiving a feature vector of an utterance having the date and time of utterance, user ID, IP address, latitude/longitude information and values of various sensors as elements. The utterance sequence models 226 are preferably stored in a non-volatile storage device.

By contrast, utterance aggregating unit 540 aggregates utterances having the same texts, from various utterances contained in corpus 510. Translation score calculating unit 542 applies each aggregated utterance to translation engine 544, whereby the translation score of the utterance is calculated. In the present embodiment, statistical translation engines translating to various languages are prepared as translation engines 544, and an average of likelihood of translation results obtained by the engines is regarded as the translation score of the utterance. Translation score calculating unit 542 forms, for each source language, a translation score DB consisting of translation scores obtained for the utterances, and stores it in utterance candidate storage units 228. In the above-described manner, training of utterance sequence model 226 and translation score DB is completed. Further, by speech recognition engine 546 and speech recognition score calculating unit 548, the speech recognition score at the time of speech recognition of each sentence contained in corpus 510 is calculated. Specifically, speech recognition engine 546 performs speech recognition of speech data of each sentence. Speech recognition score calculating unit 548 compares the result of speech recognition by speech recognition engine 546 with the transcript sentence attached beforehand to the sentence, and thereby calculates the speech recognition score of the sentence. The speech recognition score is stored for each of the utterances stored in corpus 510, in utterance candidate storage unit 228. As a result, by using pieces of information stored in utterance candidate storage unit 228, the translation score and the speech recognition score of each utterance stored in corpus 510 can be calculated.

—Speech Translation Service—

It is necessary that a speech translation application such as shown in FIG. 2 is distributed beforehand to portable terminal 104 and the like. In the present embodiment, server 106 to which portable terminal 104 can be connected is predetermined by the speech translation application. If there is a plurality of servers 106, it may be possible that the user selects a desired one therefrom.

When the user wishes to use the speech translation service of server 106, the user has roughly two options. First is the speech translation, and the second is the text translation. In the following, first, the operation by the user and the operations of portable terminal 104 and server 106 when the speech translation is used will be described, and then the operation by the user and the operations of portable terminal 104 and server 106 when the text translation is used will be described. Prior to each option, it is necessary for the user to call the settings screen by operation settings button 142 shown in FIG. 2 and to select the combination of source and target languages to be used.

For speech translation, the user has two methods. In the first method, the user presses speech input button 152, utters a sentence while the button is pressed, and releases the speech input button 152 when utterance ends. In the second method, the user presses microphone button 182 to start recording of speech, utters a sentence, and when utterance ends, presses microphone button 182 again to end recording of speech. In either case, the program calls the API corresponding to the selected process at steps 310 and 312 of FIG. 5, and recording of speech and signal processing are carried out to generate speech data of a prescribed form.

When recording ends (when speech input button 152 is released, or when microphone button 182 is pressed again while speech recording is being executed), the process of step 314 shown in FIG. 5 takes place, and the request instruction of speech translation, information of speech pair in accordance with the settings, speech data and environmental information are transmitted to server 106. The request has attached thereto the information of language pair in accordance with the settings, the date and time of utterance, the user identification information, and the environmental information including the outputs of GPS receiver 258, acceleration sensor 260, tilt sensor 262, magnetic sensor 264, luminance sensor 266, pressure sensor 268 and temperature sensor 270.

Receiving the speech translation request (step 452 of FIG. 7), server 106 selects the language pair in accordance with the language pair information in the request (steps 454 to 460), controls selecting units 410, 412, 414, 416, 434 and 436 in accordance with the selected combination of languages, and selects appropriate elements. Server 106 further performs speech recognition (step 462), automatic translation of the result of speech recognition (step 464) and speech synthesis of the result of translation (step 466). Thereafter, from the result of speech recognition and various pieces of information attached to the speech translation request, server 106 generates a feature vector of the input utterance (step 468), and using the utterance sequence model 226 and the translation and speech recognition scores of each utterance in utterance candidate storage unit 228, generates the utterance candidate recommendation list that includes utterance candidates having high possibility to be uttered next and having high translation and speech recognition scores (step 478). Finally, server 106 transmits the result of speech recognition, the text data of translation result, the synthesized speech of translation result, and the utterance candidate recommendation list to portable terminal 104 (step 472). When this process ends, server 106 proceeds to the process of the next request (step 452).

Referring to FIG. 2, receiving the response from server 106 (step 316 of FIG. 5), portable terminal 104 displays the result of speech recognition on input text display area 150, the text representing the result of automatic translation on translation result display area 170, and utterance candidate recommendation list and translation request buttons 194 on utterance candidate recommendation area 190, respectively (step 318), and outputs utterance by driving speaker 280 in accordance with the synthesized speech data (step 320). The screen is updated by the results of step 318 (step 322), and the terminal returns to the state of waiting for the next operation by the user.

When the user makes a next utterance, he/she can refer to the utterance candidate recommendation list displayed on utterance candidate recommendation area 190. Here, it is not the case that the user thinks up the next utterance out of nothing, and the user can make a next utterance while viewing specific sentences. Therefore, the user will not be annoyed. Further, as the recommendation, utterances that are highly likely be uttered following the preceding utterance are displayed. Therefore, the user will less likely be bothered by this and that when operating portable terminal 104. Further, the utterances displayed on the utterance candidate recommendation list have high translation and speech recognition scores. Therefore, if an utterance is made in accordance with the recommended utterance, the result of speech recognition will possibly be correct and, further, the result of automatic translation using the result will also possibly be correct. Therefore, conversation between the user of portable terminal 104 and the user of another language can go on smoothly without causing miscommunication.

In the present embodiment, translation request buttons 194 displayed on utterance candidate recommendation list 192 each function as a button for generating a translation request for the corresponding utterance. Specifically, when the user presses translation request button 194 corresponding to any of the utterance candidates, the corresponding text is selected as the next utterance and transmitted to server 106, as the object of next automatic translation.

In the case of text translation, portable terminal 104 operates in the following manner. Referring to FIG. 2, the user operates text input button 154 and calls the text input screen. In portable terminal 104, steps 304 to 340 of the flowchart shown in FIG. 5 are called. When the text input ends, the user presses a button to end text input (not shown in FIG. 2). Portable terminal 104 saves the input text (step 342), and updates the screen to display the input text on input text display area 150 (step 322). Thereafter, when the user further presses translation button 164, the process of steps 304 to 360 of FIG. 5 is executed, the text translation request is formed and transmitted to server 106. The request has attached thereto the text translation command, the information related to the language pair in accordance with the settings, the input text data of the source language, the date and time when translation button 164 was pressed, the identification information of the user, and the outputs of various sensors.

Receiving the request, server 106 translates the input text to the target language and synthesizes the speech, through the steps 454, 478, 480, 482, 484 and 486 shown in FIG. 7. Further, server 106 generates a feature vector from the input text and the various pieces of information attached to the text translation request, and using utterance sequence model 226 and the translation score of each utterance stored in utterance candidate storage unit 228, it generates the utterance candidate recommendation list as a list of utterances in source language having high possibility to be the next utterance and also having high translation scores. Then, the server returns the text representing the result of translation, the synthesized speech of the translation, and the utterance candidate recommendation list, to portable terminal 104.

Receiving the response, portable terminal 104 displays the text representing the result of translation on translation result display area 170, and displays utterance candidate recommendation list 192 and translation request buttons 194 on utterance candidate recommendation area 190.

Here again, the utterance candidate recommendation list helping the user to think of the next utterance is displayed on utterance candidate recommendation area 190 as in the case of speech translation. Therefore, no matter whether the next utterance is to be made by speech or input by a button, the user can easily think of the next utterance.

As described above, according to the present embodiment, in speech translation system 100 performing speech translation, when the user of portable terminal 104 makes an utterance and then tries to find the next utterance, the utterance candidate recommendation list is displayed on the screen of portable terminal 104. The displayed utterance candidates all have high possibility to be uttered following the preceding utterance, and also have high possibility to be translated correctly. Therefore, if the user thinks up the next utterance with reference to the utterance candidates, it becomes possible to continue smooth communication with the counterpart, and the possibility of misunderstanding caused by mistranslation can be reduced.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a terminal assisting communication among a plurality of persons, particularly those having different mother tongues.

REFERENCE SIGNS LIST

100 speech translation system
104 portable terminal
106 server
108 model generating unit
130 application screen
140 language display area
150 input text display area
160 reverse translation area
180 status area
190 utterance candidate recommendation area
192 utterance candidate recommendation list
220 speech recognition process
222 automatic translation process
224 speech synthesizing process
226 utterance sequence model
228 utterance candidate storage unit
230 utterance candidate list forming process
232 transmitting unit
418 speech recognition engine
422 automatic translation engine
424 speech synthesis unit
426 utterance probability calculating unit
428 utterance candidate recommendation list forming unit

The invention claimed is:

1. A speech processing system, comprising:
utterance input means for receiving an input of utterance information including a speech signal representing an utterance and prescribed environmental information representing an environment in which the utterance is made;
speech recognition means for performing speech recognition on the speech signal in the utterance information received by said utterance input means and for outputting a recognition result as a text;
data processing means for executing a prescribed data processing on the text output by said speech recognition means;
utterance sequence model storage means for storing an utterance sequence model statistically trained such that upon reception of a text of an utterance and said prescribed environmental information, a probability of an utterance in a prescribed set of utterances to be uttered successively following the utterance represented by said text can be calculated;
utterance storage means for storing utterances in said prescribed set of utterances and degree of confidence of data processing when each of said utterances in said set of utterances is processed by said data processing means; and
utterance candidate recommendation means, for scoring, in said set of utterances, candidates of utterances to be recommended to a user who made the utterance recognized by said speech recognition means, based on an evaluation score obtained by combining, in a prescribed form, a probability calculated for each utterance in said prescribed set by said utterance sequence model stored in said utterance sequence model storage means, using the result of recognition by said speech recognition means of the utterance information received by said utterance input means and the environmental information included in the speech information, and the degree of confidence of said data processing on each utterance in said prescribed set of utterances, and for recommending an utterance candidate to the user based on the scores.

2. The speech processing system according to claim 1, wherein said data processing means includes automatic translation means receiving a result of recognition output from said speech recognition means of a given utterance, for automatically translating the result of recognition to a language different from the language of said given utterance and for outputting the translated result as a text; and
said degree of confidence is likelihood of the translated result by said automatic translation means being a translation of said given utterance in said different language.

3. The speech processing system according to claim 2, wherein said data processing means further includes speech synthesizing means for synthesizing, based on the text in said different language output from said automatic translation means, a speech signal of said different language.

4. The speech processing system according to claim 1, wherein
said utterance candidate recommendation means includes means for estimating, in said set of utterances, a candidate of an utterance that successively follows the utterance speech-recognized by said speech recognition means, based on an evaluation in terms of a linear sum of the probability calculated by said utterance sequence model for each utterance in said prescribed set and the degree of confidence of each utterance in said prescribed set stored in said utterance storage means; and
in said linear sum, coefficients of said degree of confidence and said probability are both positive.

5. The speech processing system according to claim 1, further comprising utterance candidate presenting means for presenting to the user an utterance candidate recommended by said utterance candidate recommendation means.

6. The speech processing system according to claim 1, further comprising utterance text information input means, receiving utterance text information including a text representing an utterance and said prescribed environmental information, for applying the text in said utterance text information to said utterance candidate recommendation means and said data processing means, in place of the output of said speech recognition means.

7. A terminal, comprising:
a microphone;
a set of sensors for collecting pieces of information related to surrounding environment;
a display device;
a communication device; and
utterance information transmitting means, connected to said microphone, said set of sensors and said communication device, for transmitting utterance information containing a speech signal obtained from a signal output by said microphone upon reception of an utterance and pieces of information obtained from said set of sensors when said speech signal is obtained, to a prescribed speech processing server through said communication device, and for requesting speech recognition and a prescribed data processing on a result of recognition; further comprising:
process result presenting means, connected to said communication device, for receiving a process result of said data processing transmitted from said speech processing server in response to said request, and for presenting the process result to a user; and
utterance candidate recommendation list display means, receiving an utterance candidate recommendation list recommended as a plurality of utterance candidates from said speech processing server and displaying the list on said display device, and thereby for recommending utterance candidates to said user.

8. The terminal according to claim 7, wherein
said prescribed data processing performed by said speech processing server on the result of said speech recognition is a process of automatically translating said utterance to a language different from the language of said utterance and further synthesizing a speech of a result of the automatic translation;
the process result of said data processing transmitted from said speech processing server is a speech signal representing the speech synthesized by said speech processing server; and
said process result presenting means includes a speaker, and means for driving said speaker with the speech signal representing the speech synthesized by said speech processing server.

9. The terminal according to claim 7, further comprising:
selecting means operable by a user for selecting any of the utterance candidates displayed by said utterance candidate recommendation list; and
utterance text information transmitting means, responsive to selection of any of the utterance candidates in said utterance candidate recommendation list by said selecting means, for transmitting utterance text information including a text of the selected utterance candidate and pieces of information obtained from said set of sensors to a prescribed speech processing server through said communication device, and requesting said prescribed data processing on said utterance text information.

10. The terminal according to claim 7, wherein:
said display device has a plurality of display areas including a first area, a second area, and a third area;
said terminal further comprising means for causing said display device to show said result of recognition on said first area,
said prescribed data processing including performing automatic translation of said utterance into a language different from a language of said utterance and synthesizing a speech sound signal representing a result of said translation,
said process result of said data processing including the speech sound signal synthesized by said speech processing server;
said terminal further comprising:
translation result display means connected to receive said process result of said data processing, for causing said display device to show at least said result of said translation in said result of said data processing on said second area; and
utterance candidate recommend list display means for causing said display device to show said utterance candidate recommend list on said third area.

11. The terminal according to claim 10, wherein
said display area further includes a fourth area;
said prescribed data processing further includes performing reverse translation of said result of said translation into an original language of said utterance;
said process result of said data processing includes a speech sound signal representing a result of said reverse translation; and
said terminal further includes reverse translation result display means for causing said display device to show said result of said reverse translation on said fourth area.

12. The terminal according to claim 11, further including:
selecting means operable by a user to select any one of the utterance candidates displayed on said third area; and
means in response to said selecting means selecting one of utterance candidates in said utterance candidate recommend list, for causing said display device to show said utterance candidate selected on said first area.

13. The terminal according to claim 10, further including:
selecting means operable by a user to select any one of the utterance candidates displayed on said third area; and
means in response to said selecting means selecting one of utterance candidates in said utterance candidate recommend list, for causing said display device to show said utterance candidate selected on said first area of said display device.

14. A speech processing system, comprising:
a non-transitory computer readable medium storing a prescribed set of utterances; and
at least one processor configured to:
receive utterance information including a speech signal and environmental information, wherein the speech signal represents an utterance made by a user and the environmental information includes measurements of an environment in which the utterance is made;
perform speech recognition on the received speech signal and output a speech recognition result as text;
execute a prescribed data processing on the outputted text, wherein the prescribed data processing has been executed on each of the prescribed set of utterances and indicates for each of the prescribed set of utterances a degree of confidence of the executed prescribed data processing;
for each particular utterance in the prescribed set of utterances stored in the non-transitory computer readable medium, calculate a probability of the particular utterance successively following the utterance represented by said text by applying a statistically trained utterance sequence model to the text and received environmental information;
score said prescribed set of utterances to determine utterance candidates to be recommended to the user that made the utterance recognized by said speech recognition means, wherein the scoring for each of the prescribed set of utterances is based on an evaluation score obtained by combining the calculated probability and the degree of confidence; and
presenting at least one of the utterance candidates to the user, wherein the presented at least one utterance candidate is selected from the utterance candidates having top scores.

* * * * *